(12) United States Patent
Iben et al.

(10) Patent No.: US 12,073,858 B2
(45) Date of Patent: *Aug. 27, 2024

(54) MECHANISM TO SHIFT THE HEAD SPAN OF A TAPE HEAD AT A WAFER LEVEL (71) Applicant: International Business Machines Corporation, Armonk, NY (US)

(72) Inventors: Icko E. T. Iben, Santa Clara, CA (US); Jason Liang, Campbell, CA (US); Hoodin Hamidi, San Francisco, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/358,684

(22) Filed: Jul. 25, 2023

(65) Prior Publication Data
US 2023/0386509 A1 Nov. 30, 2023

Related U.S. Application Data

(63) Continuation of application No. 17/470,977, filed on Sep. 9, 2021, now Pat. No. 11,810,602.

(51) Int. Cl.
*G11B 5/31* (2006.01)
*G11B 5/008* (2006.01)
(Continued)

(52) U.S. Cl.
CPC ........ *G11B 5/3103* (2013.01); *G11B 5/00826* (2013.01); *G11B 5/265* (2013.01);
(Continued)

(58) Field of Classification Search
None
See application file for complete search history.

(56) References Cited

U.S. PATENT DOCUMENTS 5,742,995 A 4/1998 Amin et al.
7,567,409 B2 7/2009 Lee et al.
(Continued)

FOREIGN PATENT DOCUMENTS

WO 1998039770 A1 9/1998
WO 2004038701 A3 7/2004

OTHER PUBLICATIONS

U.S. Appl. No. 17/470,977, filed Sep. 9, 2021.
(Continued)

*Primary Examiner* — Craig A. Renner
(74) *Attorney, Agent, or Firm* — KONRAD, RAYNES, DAVDA & VICTOR LLP; Rabindranath Dutta (57) ABSTRACT

Provided are a magnetic tape head, a magnetic tape drive, and a computational device in which the magnetic tape head is comprised of a plurality of modules comprising reader modules and writer modules, and a plurality of elements, wherein a total of shifts of selected elements of the plurality of elements that are shifted add up to a desired total shift to realign the plurality of modules, such that a median head span of each module type matches as close as possible to a desired value of a head span for all module types including the reader modules and the writer modules and wherein the head span is shifted at a wafer level.

18 Claims, 11 Drawing Sheets

(51) Int. Cl.
  *G11B 5/265* (2006.01)
  *G11B 5/29* (2006.01)
  *G11B 5/39* (2006.01)
  *G11B 5/48* (2006.01)

(52) U.S. Cl.
  CPC .............. *G11B 5/29* (2013.01); *G11B 5/3958* (2013.01); *G11B 5/3977* (2013.01); *G11B 5/4893* (2013.01)

(56) References Cited

U.S. PATENT DOCUMENTS

| | | |
|---|---|---|
| 8,184,394 B2 | 5/2012 | Poorman et al. |
| 8,307,539 B1 | 11/2012 | Rudy et al. |
| 9,142,224 B2 | 9/2015 | Hansen et al. |
| 10,902,882 B1 | 1/2021 | Biskeborn |
| 11,810,602 B2 * | 11/2023 | Iben et al. ......... G11B 5/00826 |
| 2005/0013042 A1 | 1/2005 | Rubas et al. |
| 2005/0134989 A1 | 6/2005 | Girvin et al. |
| 2005/0168865 A1 | 8/2005 | Simmons, Jr. et al. |
| 2007/0047142 A1 | 3/2007 | Biskeborn |
| 2007/0047146 A1 | 3/2007 | Biskeborn et al. |
| 2007/0097556 A1 | 5/2007 | Biskeborn et al. |
| 2007/0109681 A1 | 5/2007 | Biskeborn et al. |
| 2008/0030886 A1 | 2/2008 | Biskeborn et al. |
| 2008/0137235 A1 | 6/2008 | Biskeborn et al. |
| 2008/0252357 A1 | 10/2008 | Biskeborn et al. |
| 2008/0291566 A1 | 11/2008 | Biskeborn et al. |
| 2009/0073603 A1 | 3/2009 | Koeppe |
| 2015/0015985 A1 | 1/2015 | Biskeborn et al. |
| 2015/0077881 A1 | 3/2015 | Biskeborn et al. |
| 2023/0072460 A1 | 3/2023 | Iben et al. |

OTHER PUBLICATIONS

Office Action dated Jun. 27, 2022, 30 pp., for U.S. Appl. No. 17/470,977, filed Sep. 9, 2021.
Response dated Sep. 27, 2022, 24 pp. to Office Action dated Jun. 27, 2022, 30 pp., for U.S. Appl. No. 17/470,977, filed Sep. 9, 2021.
Final Office Action dated Jan. 18, 2023, 8 pp. for U.S. Appl. No. 17/470,977.
Amend dated Apr. 18, 2023, to Final Office Action dated Jan. 18, 2023, 8 pp. for U.S. Appl. No. 17/470,977.
Notice of Allowance dated May 11, 2023, pp. 8, for U.S. Appl. No. 17/470,977, filed Sep. 9, 2021.
List of IBM patents and applications treated as related dated Jul. 25, 2023, 2 pp.

* cited by examiner

| Table 1. Pitch for example design | | | |
|---|---|---|---|
| S01-R01, R33-S02 | μm | 100.00 | 404 |
| R(n+)-R(n) | μm | 85.00 | 402 |

FIG. 4

First exemplary options for shifting elements

Option 1a. Head Span Increase, 80 nm. R17 is center. For R18-R33 Pitch_0 is from Left Neighbor.

| Element | # | S01 | R01 | R02 | R03 | R04 | R05 | R06 | R07 | R08 | R09 | R10 | R11 | R12 | R13 | R14 | R15 | R16 | R17 |
|---|---|---|---|---|---|---|---|---|---|---|---|---|---|---|---|---|---|---|---|
| Pitch_0 | μm | 100.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 0.00 |
| ΔPitch | nm | 0 | 20 | 0 | 0 | 0 | 0 | 0 | 0 | 0 | 0 | 0 | 0 | 0 | 0 | 0 | 0 | 0 | 0 |
| Pitch_N | μm | 100.00 | 85.02 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 0.00 |

Option 1b. Head Span Increase, 80 nm. R17 is center. For R18-R33 Pitch_0 is from Left Neighbor.

| Element | # | S01 | R01 | R02 | R03 | R04 | R05 | R06 | R07 | R08 | R09 | R10 | R11 | R12 | R13 | R14 | R15 | R16 | R17 |
|---|---|---|---|---|---|---|---|---|---|---|---|---|---|---|---|---|---|---|---|
| Pitch_0 | μm | 100.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 0.00 |
| ΔPitch | nm | 0 | 0 | 0 | 0 | 20 | 0 | 0 | 0 | 0 | 20 | 0 | 20 | 0 | 0 | 0 | 0 | 0 | 0 |
| Pitch_N | μm | 100.00 | 85.00 | 85.00 | 85.00 | 85.02 | 85.00 | 85.00 | 85.00 | 85.00 | 85.02 | 85.00 | 85.02 | 85.00 | 85.00 | 85.00 | 85.00 | 85.00 | 0.00 |

Option 2a. Head Span Increase, 120 nm. R17 is center. For R18-R33 Pitch_0 is from Left Neighbor.

| Element | # | S01 | R01 | R02 | R03 | R04 | R05 | R06 | R07 | R08 | R09 | R10 | R11 | R12 | R13 | R14 | R15 | R16 | R17 |
|---|---|---|---|---|---|---|---|---|---|---|---|---|---|---|---|---|---|---|---|
| Pitch_0 | μm | 100.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 0.00 |
| ΔPitch | nm | 0 | 20 | 0 | 0 | 0 | 0 | 0 | 0 | 20 | 0 | 0 | 0 | 20 | 0 | 0 | 0 | 0 | 0 |
| Pitch_N | μm | 100.00 | 85.02 | 85.00 | 85.00 | 85.00 | 85.00 | 85.00 | 85.00 | 85.02 | 85.00 | 85.00 | 85.00 | 85.02 | 85.00 | 85.00 | 85.00 | 85.00 | 0.00 |

Option 2b. Head Span Increase, 120 nm. R17 is center. For R18-R33 Pitch_0 is from Left Neighbor.

| Element | # | S01 | R01 | R02 | R03 | R04 | R05 | R06 | R07 | R08 | R09 | R10 | R11 | R12 | R13 | R14 | R15 | R16 | R17 |
|---|---|---|---|---|---|---|---|---|---|---|---|---|---|---|---|---|---|---|---|
| Pitch_0 | μm | 100.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 0.00 |
| ΔPitch | nm | 0 | 0 | 0 | 20 | 0 | 0 | 0 | 20 | 0 | 0 | 0 | 0 | 20 | 0 | 0 | 0 | 0 | 0 |
| Pitch_N | μm | 100.00 | 85.00 | 85.00 | 85.02 | 85.00 | 85.00 | 85.00 | 85.02 | 85.00 | 85.00 | 85.00 | 85.00 | 85.02 | 85.00 | 85.00 | 85.00 | 85.00 | 0.00 |

FIG. 5A

502 — For R16 to R01 and S01, Pitch_O & Pitch_N is from Right Neighbor.

| R18 | R19 | R20 | R21 | R22 | R23 | R24 | R25 | R26 | R27 | R28 | R29 | R30 | R31 | R32 | R33 | S02 | Span |
|---|---|---|---|---|---|---|---|---|---|---|---|---|---|---|---|---|---|
| 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 100.00 | 2920.00 |
| 0 | 0 | 0 | 0 | 0 | 0 | 0 | 20 | 0 | 0 | 0 | 0 | 0 | 0 | 0 | 0 | 0 | 80.00 |
| 85.00 | 85.00 | 85.00 | 85.00 | 85.00 | 85.00 | 85.00 | 85.02 | 85.00 | 85.00 | 85.00 | 85.00 | 85.00 | 85.00 | 85.00 | 85.00 | 100.00 | 2920.08 |

504 — For R16 to R01 and S01, Pitch_O & Pitch_N is from Right Neighbor.

| R18 | R19 | R20 | R21 | R22 | R23 | R24 | R25 | R26 | R27 | R28 | R29 | R30 | R31 | R32 | R33 | S02 | Span |
|---|---|---|---|---|---|---|---|---|---|---|---|---|---|---|---|---|---|
| 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 100.00 | 2920.00 |
| 0 | 0 | 0 | 0 | 0 | 0 | 0 | 0 | 0 | 0 | 0 | 20 | 0 | 0 | 0 | 0 | 0 | 80.00 |
| 85.00 | 85.00 | 85.00 | 85.00 | 85.00 | 85.00 | 85.00 | 85.00 | 85.00 | 85.00 | 85.00 | 85.02 | 85.00 | 85.00 | 85.00 | 85.00 | 100.00 | 2920.08 |

506 — For R16 to R01 and S01, Pitch_O & Pitch_N is from Right Neighbor.

| R18 | R19 | R20 | R21 | R22 | R23 | R24 | R25 | R26 | R27 | R28 | R29 | R30 | R31 | R32 | R33 | S02 | Span |
|---|---|---|---|---|---|---|---|---|---|---|---|---|---|---|---|---|---|
| 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 100.00 | 2920.00 |
| 0 | 0 | 0 | 0 | 0 | 0 | 0 | 0 | 0 | 20 | 0 | 0 | 0 | 0 | 0 | 0 | 0 | 120.00 |
| 85.00 | 85.00 | 85.00 | 85.00 | 85.00 | 85.00 | 85.00 | 85.00 | 85.00 | 85.02 | 85.00 | 85.00 | 85.00 | 85.00 | 85.00 | 85.00 | 100.00 | 2920.12 |

508 — For R16 to R01 and S01, Pitch_O & Pitch_N is from Right Neighbor.

| R18 | R19 | R20 | R21 | R22 | R23 | R24 | R25 | R26 | R27 | R28 | R29 | R30 | R31 | R32 | R33 | S02 | Span |
|---|---|---|---|---|---|---|---|---|---|---|---|---|---|---|---|---|---|
| 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 100.00 | 2920.00 |
| 0 | 0 | 0 | 20 | 0 | 0 | 0 | 0 | 20 | 0 | 0 | 0 | 0 | 20 | 0 | 0 | 0 | 120.00 |
| 85.00 | 85.00 | 85.00 | 85.02 | 85.00 | 85.00 | 85.00 | 85.00 | 85.02 | 85.00 | 85.00 | 85.00 | 85.00 | 85.02 | 85.00 | 85.00 | 100.00 | 2920.12 |

| For R16 to R01 and S01, Pitch_0 & Pitch_N is from Right Neighbor. | | | | | | | | | | | | | | | | | 602 |
|---|---|---|---|---|---|---|---|---|---|---|---|---|---|---|---|---|---|
| R18 | R19 | R20 | R21 | R22 | R23 | R24 | R25 | R26 | R27 | R28 | R29 | R30 | R31 | R32 | R33 | S02 | Span |
| 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 100.00 | 2920.00 |
| 0 | 0 | 0 | 20 | 0 | 0 | 0 | 20 | 0 | 0 | 0 | 20 | 0 | 0 | 0 | 20 | 0 | 160.00 |
| 85.00 | 85.00 | 85.00 | 85.02 | 85.00 | 85.00 | 85.00 | 85.02 | 85.00 | 85.00 | 85.00 | 85.02 | 85.00 | 85.00 | 85.00 | 85.02 | 100.00 | 2920.16 |

FIG. 6B

Third exemplary options for shifting elements

| Option 4a. LT09 Reader Head Span Increase, 200 nm. R17 is center. For R18-R33 Pitch_0 is from Left Neighbor. |
| --- |

| Element | # | S01 | R01 | R02 | R03 | R04 | R05 | R06 | R07 | R08 | R09 | R10 | R11 | R12 | R13 | R14 | R15 | R16 | R17 |
|---|---|---|---|---|---|---|---|---|---|---|---|---|---|---|---|---|---|---|---|
| Pitch_0 | μm | 100.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 0.00 |
| ΔPitch | nm | 20 | 0 | 0 | 20 | 0 | 0 | 0 | 0 | 0 | 0 | 0 | 0 | 0 | 0 | 0 | 0 | 0 | 0 |
| Pitch_N | μm | 100.00 | 85.00 | 85.00 | 85.02 | 85.00 | 85.00 | 85.00 | 85.00 | 85.00 | 85.00 | 85.00 | 85.00 | 85.00 | 85.00 | 85.00 | 85.00 | 85.00 | 0.00 |

| Option 4b. LT09 Reader Head Span Increase, 200 nm. R17 is center. For R18-R33 Pitch_0 is from Left Neighbor. |
| --- |

| Element | # | S01 | R01 | R02 | R03 | R04 | R05 | R06 | R07 | R08 | R09 | R10 | R11 | R12 | R13 | R14 | R15 | R16 | R17 |
|---|---|---|---|---|---|---|---|---|---|---|---|---|---|---|---|---|---|---|---|
| Pitch_0 | μm | 100.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 0.00 |
| ΔPitch | nm | 0 | 0 | 20 | 0 | 0 | 20 | 0 | 0 | 20 | 0 | 0 | 20 | 0 | 0 | 20 | 0 | 0 | 0 |
| Pitch_N | μm | 100.00 | 85.00 | 85.02 | 85.00 | 85.00 | 85.02 | 85.00 | 85.00 | 85.02 | 85.00 | 85.00 | 85.02 | 85.00 | 85.00 | 85.02 | 85.00 | 85.00 | 0.00 |

| Option 4c. LT09 Reader Head Span Increase, 200 nm. R17 is center. For R18-R33 Pitch_0 is from Left Neighbor. |
| --- |

| Element | # | S01 | R01 | R02 | R03 | R04 | R05 | R06 | R07 | R08 | R09 | R10 | R11 | R12 | R13 | R14 | R15 | R16 | R17 |
|---|---|---|---|---|---|---|---|---|---|---|---|---|---|---|---|---|---|---|---|
| Pitch_0 | μm | 100.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 0.00 |
| ΔPitch | nm | 0 | 20 | 0 | 0 | 0 | 0 | 0 | 20 | 0 | 0 | 0 | 20 | 0 | 20 | 20 | 0 | 0 | 0 |
| Pitch_N | μm | 100.00 | 85.02 | 85.00 | 85.00 | 85.00 | 85.00 | 85.00 | 85.02 | 85.00 | 85.00 | 85.00 | 85.02 | 85.00 | 85.02 | 85.02 | 85.00 | 85.00 | 0.00 |

FIG. 7A

| For R16 to R01 and S01, Pitch_0 & Pitch_N is from Right Neighbor. | | | | | | | | | | | | | | | | | | |
|---|---|---|---|---|---|---|---|---|---|---|---|---|---|---|---|---|---|---|
| R18 | R19 | R20 | R21 | R22 | R23 | R24 | R25 | R26 | R27 | R28 | R29 | R30 | R31 | R32 | R33 | S02 | Span |
| 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 100.00 | 2920.00 |
| 0 | 20 | 0 | 0 | 0 | 20 | 0 | 0 | 0 | 20 | 0 | 0 | 0 | 20 | 0 | 0 | 0 | 200.00 |
| 85.00 | 85.02 | 85.00 | 85.00 | 85.00 | 85.02 | 85.00 | 85.00 | 85.00 | 85.02 | 85.00 | 85.00 | 85.00 | 85.02 | 85.00 | 85.00 | 100.00 | 2920.20 |

702

| For R16 to R01 and S01, Pitch_0 & Pitch_N is from Right Neighbor. | | | | | | | | | | | | | | | | | | |
|---|---|---|---|---|---|---|---|---|---|---|---|---|---|---|---|---|---|---|
| R18 | R19 | R20 | R21 | R22 | R23 | R24 | R25 | R26 | R27 | R28 | R29 | R30 | R31 | R32 | R33 | S02 | Span |
| 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 100.00 | 2920.00 |
| 0 | 0 | 20 | 20 | 0 | 0 | 20 | 0 | 20 | 0 | 0 | 20 | 20 | 0 | 0 | 0 | 0 | 200.00 |
| 85.00 | 85.00 | 85.02 | 85.02 | 85.00 | 85.00 | 85.02 | 85.00 | 85.02 | 85.00 | 85.00 | 85.02 | 85.02 | 85.00 | 85.00 | 85.00 | 100.00 | 2920.20 |

704

| For R16 to R01 and S01, Pitch_0 & Pitch_N is from Right Neighbor. | | | | | | | | | | | | | | | | | | |
|---|---|---|---|---|---|---|---|---|---|---|---|---|---|---|---|---|---|---|
| R18 | R19 | R20 | R21 | R22 | R23 | R24 | R25 | R26 | R27 | R28 | R29 | R30 | R31 | R32 | R33 | S02 | Span |
| 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 85.00 | 100.00 | 2920.00 |
| 0 | 0 | 0 | 20 | 0 | 0 | 20 | 0 | 0 | 20 | 0 | 0 | 20 | 0 | 0 | 20 | 0 | 200.00 |
| 85.00 | 85.00 | 85.00 | 85.02 | 85.00 | 85.00 | 85.02 | 85.00 | 85.00 | 85.02 | 85.00 | 85.00 | 85.02 | 85.00 | 85.00 | 85.02 | 100.00 | 2920.20 |

MECHANISM TO SHIFT THE HEAD SPAN OF A TAPE HEAD AT A WAFER LEVEL

CROSS-REFERENCE TO RELATED APPLICATION

This application is a continuation of U.S. patent application Ser. No. 17/470,977, filed Sep. 9, 2021, which application is incorporated herein by reference in its entirety.

BACKGROUND

Embodiments relate to a mechanism to shift the head span of a tape head at a wafer level.

In magnetic media, data is typically stored as magnetic transitions, e.g., data is magnetically recorded on a surface of the magnetic media. The data stored is typically arranged in data tracks. A typical magnetic storage medium, such as a magnetic tape, includes a plurality of data tracks.

A tape head is a type of transducer used to convert electronic data into magnetic bits to store the information. The tape is magnetized in a pattern. The tape moves across a read/write head, with the tape head surface in contact with the magnetic tape media being called the Tape Bearing Surface (TBS). Inductive writers write magnetic transitions (or bits) to the magnetic surface of the tape. The Read elements may be inductive or magnetoresistive (MR) sensors which convert the magnetic bits into electrical signals which can be converted to data bits using process electronics in the tape drive containing the tape head. Transducer (read/write) heads are positioned relative to the data tracks to read/write data along the tracks. Accordingly, a tape head locates each data track and accurately follows the path of the data track. To achieve this, servo techniques have been developed which allow for a precise positioning of the tape head relative to the data tracks. One such technique makes use of servo patterns, that is, patterns of signals or recorded marks on the medium, which are tracked by the head. The servo patterns are recorded on the tape in order to provide a position reference for the data tracks. Read operations on magnetic tapes are performed by read heads, whereas write operations on magnetic tapes are performed by write heads.

Writing and reading simultaneously of several tracks in parallel is a widely used approach how to achieve both high area densities and high data rates. A plurality of read and write and servo elements are present in a tape head for reading and writing data on tape. The write elements, the read elements, and the servo elements are all fabricated on a non-magnetic substrate referred to as a chip of wafer. The write elements, the read elements and the servo elements may also be referred to as write heads, read heads, and servo heads respectively.

SUMMARY OF THE PREFERRED EMBODIMENTS

Provided are a magnetic tape head, a magnetic tape drive, and a computational device in which the magnetic tape head is comprised of a plurality of elements, wherein a pitch between adjacent elements of the plurality of elements is not identical.

In certain embodiments, the plurality of elements comprise readers or writers, or both readers and writers.

In further embodiments, selected elements of the plurality of elements that are shifted from a nominal position are selected in a symmetrical manner in the plurality of elements.

In yet further embodiments, a total of shifts of the elements of the plurality of elements that are shifted add up to a desired total shift to realign a plurality of modules, such that the median head span of each module type match as closely as possible to a desired value of the head span for all module types.

In additional embodiments, wherein a head span is increased by multiples of a minimum step size while realigning the plurality of modules such that the median head span of each module type match as closely as possible to a desired value of the head span for all module types.

In yet additional embodiments, a group of elements of the plurality of elements has a different pitch or separation from other groups of elements.

In yet certain embodiments, the magnetic tape head contains symmetrically located servo elements such that a servo-to-servo separation of the symmetrically located servo elements are within 50 nm of an ideal or specified value, wherein the servo-to-servo separation is the head span.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Embodiments described in this disclosure relate to a mechanism to shift the head span of a tape head at a wafer level. Elements such as read elements or write elements are symmetrically shifted to achieve an overall shift in head span to match a desired value of head span as close as possible. The need for symmetry is present, so that when aligning the read/write elements during read/write operations the multiplicity of read/write elements will be as close to centered for both read and write operations. The read or write elements are shifted during fabrication so that the head span is identical for both, while at the same time complying with the constraint that while shifting, a head span is increased by multiples of a predetermined minimum step size while realigning the plurality of modules in a tape head to have identical head span.

Figure 1:
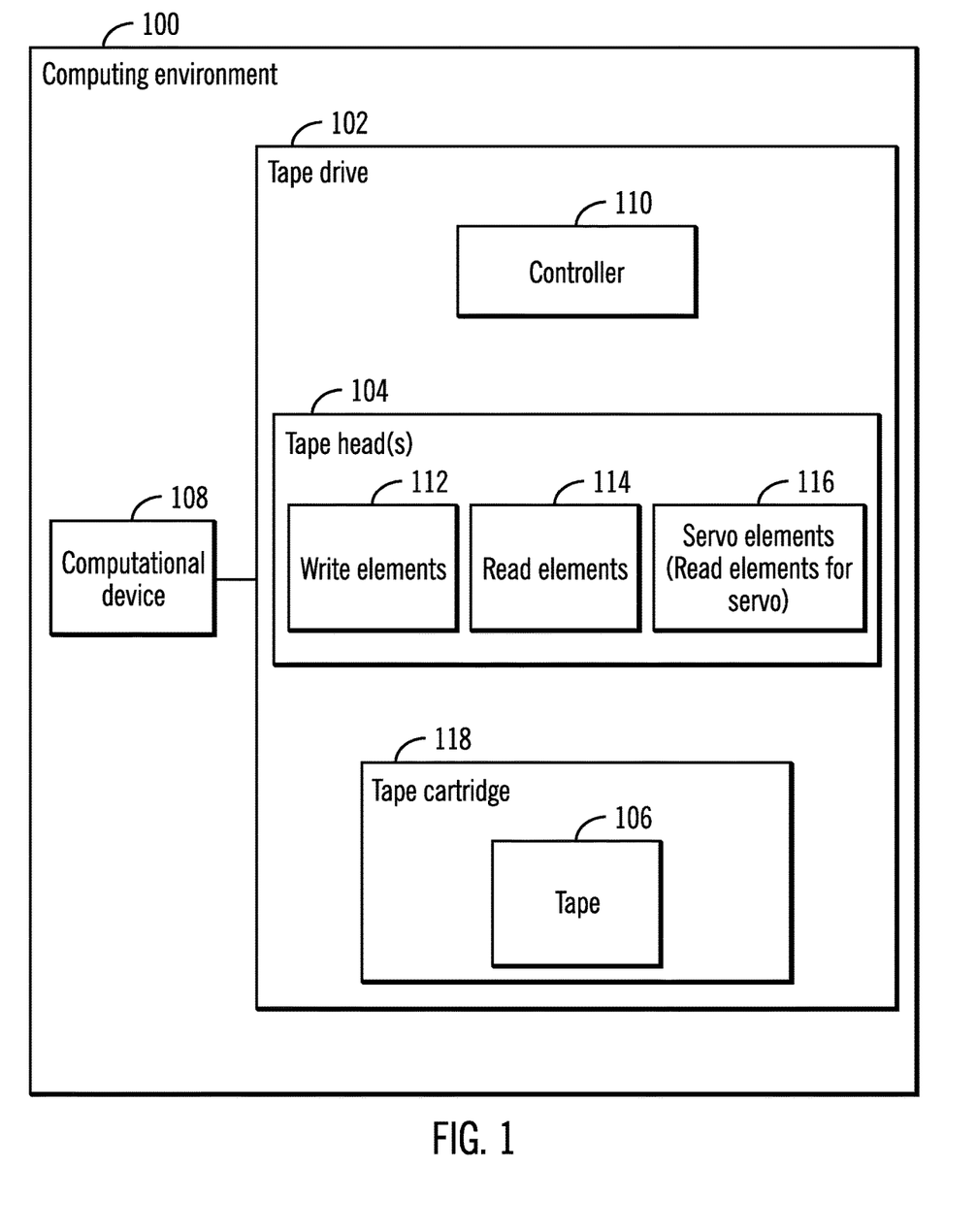
FIG. 1 illustrates a block diagram of a computing environment comprising a tape drive including tape heads that are used to read data from a tape and to write date to a tape, where the tape drive is coupled to a computational device, in accordance with certain embodiments.

FIG. 1 illustrates a block diagram of a computing environment 100 comprising a tape drive 102 including tape heads 104 that are used to read data from a tape 106 and to write date to a tape 106, where the tape drive 102 is coupled to a computational device 108, in accordance with certain embodiments.

The tape drive 102 that uses tapes 106 includes a controller 110 that controls the operations of a write elements 112, read elements 114, and servo elements 116 that are read elements used for servo. The write elements 112, the read elements 114, and the servo elements 116 may be referred to as data write heads or write heads, data read heads or read heads, and servo heads respectively.

The tape 106 is inserted in the tape cartridge 118 of the tape drive 102. The controller 110 of the tape drive 102 uses the servo elements to read servo patterns written on the tape 106 and then in response to an input/output (I/O) operation received from a computational device 108 performs read operations from the tape 106 with the read elements 114 and write operations from the tape 106 with the write elements 112, where the computational device 108 may include any suitable computational device known in art, such as, a personal computer, a workstation, a server, a mainframe, a hand held computer, a palm top computer, a telephony device, a network appliance, a blade computer, a processing device, a storage controller, etc.

Figure 2:
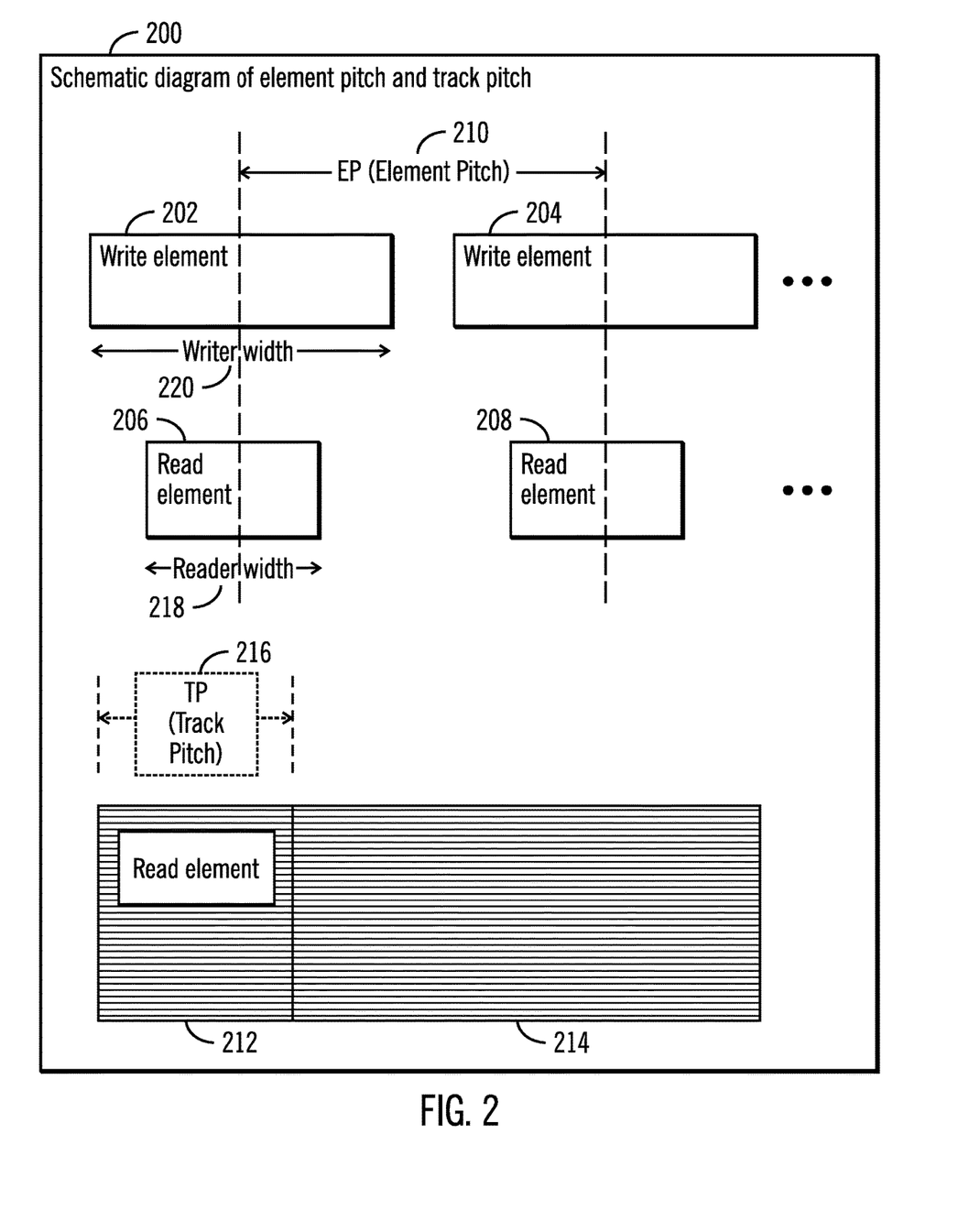
FIG. 2 illustrates a block diagram that shows a schematic diagram of element pitch and track pitch in a configuration of read and write elements in the tape heads, in accordance with certain embodiments.

FIG. 2 illustrates a block diagram 200 that shows a schematic diagram of element pitch and track pitch in a configuration of read and write elements in the tape heads 104, in accordance with certain embodiments. The element pitch and track pitch are not drawn to scale, but their relative dimensions are shown.

Tape heads 104 contain multiple read elements and write elements to simultaneously write and/or read multiple tracks simultaneously. A plurality of write elements 202, 204 and a plurality of read elements 206, 208 on the tape heads 104 are shown in FIG. 2.

The pitch 210, or spacing between elements, (EP) is conventionally the same between elements and for processing reasons, is large relative to the pitch of the tracks 212, 214 written on the magnetic media, TP 216 as shown in FIG. 2. The tape passes under the read and write elements to have tracks written on them first in one direction and then in another direction.

The physical element containing the read and write elements when cut out from a wafer is sometimes called a chip at the wafer level and a module when attached to a substrate used for building into a head. The read and write chips also contain read elements called servos used to steer the chip and keep the read and write elements aligned properly to maintain the written track spacing or to remain aligned over the written track during read-back. The servos read pre-written "servo patterns" written on the tape.

In FIG. 2, the reader width 218 that indicates the width of a read element and the write width 220 that indicates the width of a write element are shown.

Figure 3:
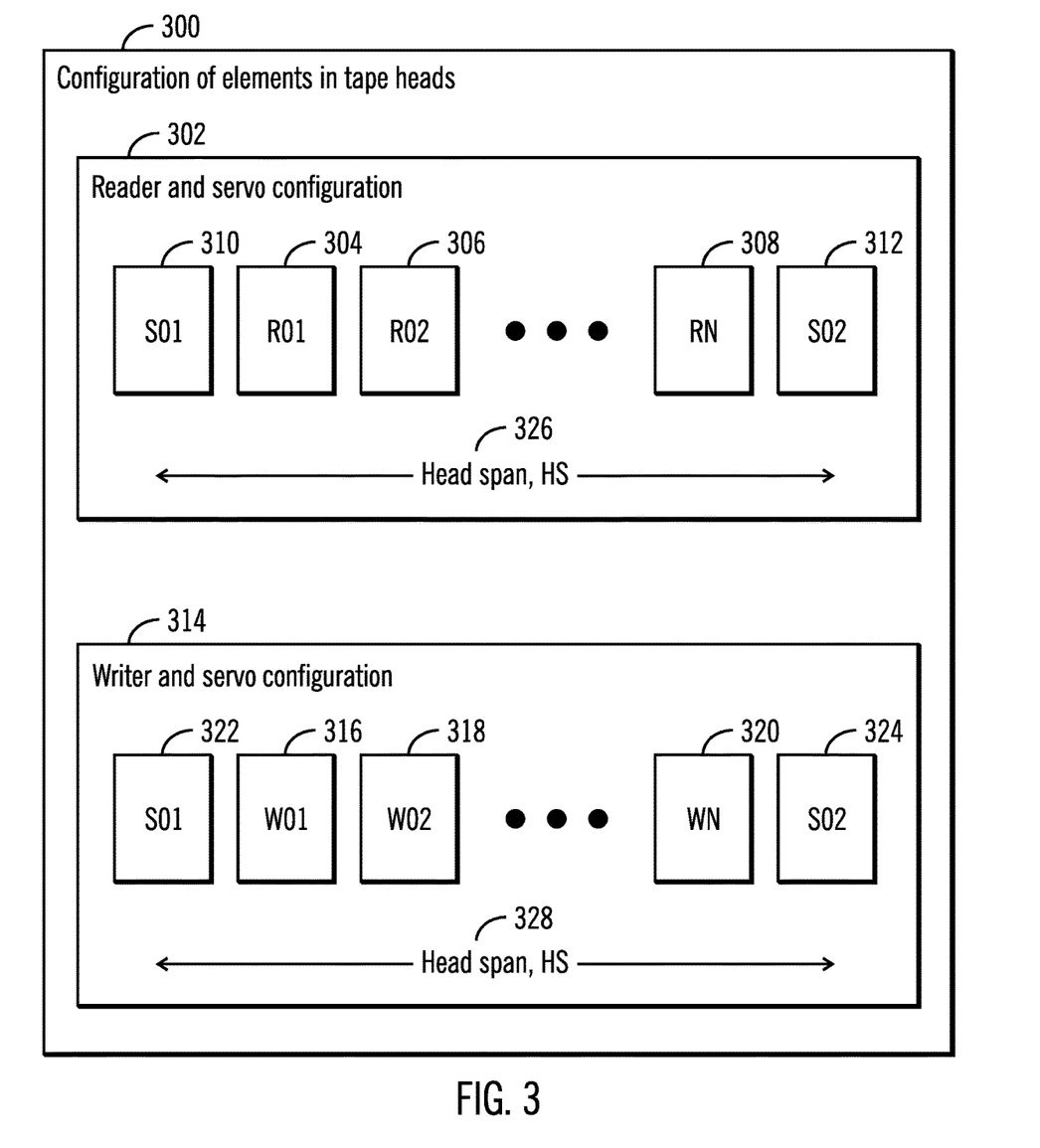
FIG. 3 illustrates a block diagram that shows configuration of elements in tape heads, in accordance with certain embodiments.

FIG. 3 illustrates a block diagram 300 that shows configuration of elements in tape heads, in accordance with certain embodiments.

In one conventional design, the servos are aligned outside the read or write elements. For example, block 302 shows a reader and servo configuration with N read elements R01 304, R02 306, . . . , RN 308, and two servos S01 310, S02 312, where the alignment of the servos and read elements in consecutive order are S01, R01, R02, . . . , RN, S02, where S01 and S02 are the two servos and RM is the $M^{th}$ read element, as shown in FIG. 3.

For writer chips (modules), the read elements are replaced by write elements, WM. For example, block 314 shows a writer and servo configuration with N write elements W01 316, W02 318, . . . , WN 320, and two servos S01 322, S02 324, where the alignment of the servos and write elements in consecutive order are S01, W01, W02, . . . , WN, S02, where S01 and S02 are the two servos and WM is the $M^{th}$ write element, as shown in FIG. 3.

In certain embodiments, for processing reasons, the element pitch, EP, is much greater than the track pitch, TP, so EP>>TP. For example, EP may be on the order of 100 μm (1E−4 m) while the TP may be on the order of 1 μm (1000 nm). The difference between the TP and the reader width, $W_r$, may be on the order of 100 to 400 nm (TP−$W_r$). For a read element centered on the written track the separation between the edge of the read element and the edge of the written track, FE, is:

$$FE = \left(\frac{TP - W_r}{2}\right).$$

The head span, HS, 326, 328 from S01 to S02 is of the order of HS=(N+1)·EP, where in FIG. 3 the head span for the reader module is shown via reference numeral 326 and the head span for the writer module is shown via reference numeral 328. With N on the order of 30 elements, the HS is on the order of 3.2 mm (31·0.1 mm), or 1000 times the separation of the edge of a perfectly centered reader from the edge of a perfectly written data track.

Developing features on a wafer has limitations in step sizes which is on the order of 10s of nm. If, for example, the necessary shift in span is 200 nm and the minimum step size is 10 nm ($\Delta_{StepMin}$=10 nm) and there are 35 elements ($N_{element}$) on the chip, then the allowed change in head span (ΔSpan) is in increments of 340 nm (ΔSpan=($N_{element}$−1)·$\Delta_{StepMin}$), which is too coarse for the needed shift of 200 nm. During fabrication of heads the head span needs to be adjusted to align the reader and writers.

Certain embodiments, provide mechanism is needed to adjust the head span at the wafer to shift the span by levels of the order of 100 nm.

Another means to improve tolerance to head span shifts, termed scaled heads, uses a strategy which maintains the same pitch between reader tracks and shifts the read track width from the center to the outer read element, with the center read track being the widest and the outer tracks the narrowest. The scaled head approach does not change the overall pitch as in certain embodiments provided in this disclosure The scaled head approach also decreases the error-rate performance of the narrower reader.

Certain embodiments provide mechanisms to shift the overall head span by distances of $\Delta Span_{Required}$<($N_{element}$−1)·$\Delta_{PitchMin}$ to make a shift not for every element, but in steps. For example, stepping every other element by $\Delta_{PitchMin}$. This may cut the adjusted head span in half.

Figure 4:
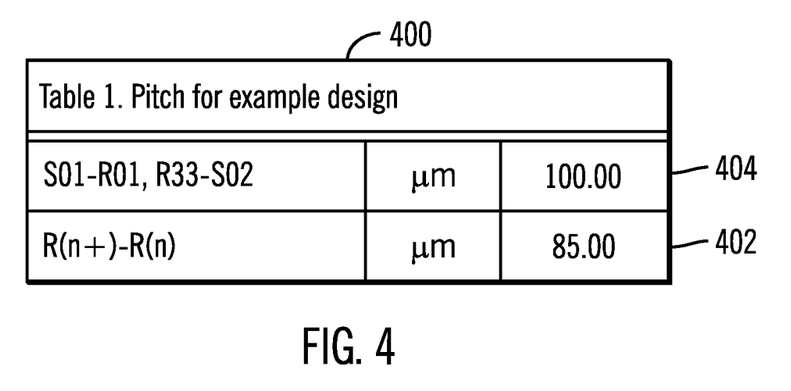
FIG. 4 illustrates a table that shows the pitch for an example design.

FIG. 4 illustrates a table (Table 1 shown by reference numeral 400) that shows the pitch for an example design.

The total head span is defined as the separation between the two end servos, S01 and S02. In the examples to be provided below, there are 33 readers with an initial pitch given in Table 1 400. S01 and S02 are the two end servos and Rn are reader or writer elements in this example from 1 to 33. The pitch between two consecutive reader elements is 85 μm (shown via reference numeral 402) and the pitch between servo S0 and reader R01 is the same as the pitch between reader R33 and servo S02 and equals 100 μm (as shown via reference numeral 404).

The minimum feature shift for the wafer stepper, $\Delta_{StepMin}$, is taken as 20 nm. So, if all elements are stepped by the minimum feature, with 33 read and 2 servo elements, $N_{element}$=35, and the minimum change in span shift, $\Delta Span_{Min}$, would be 680 nm: $\Delta Span_{Min} = (N_{element}-1) \cdot \Delta_{StepMin}$.

With the pitch values given in Table 1 of FIG. 4, the total head span is 2,920,000 nm.

In certain embodiments, to change the head span by values less than the is to shift some tracks, but not all tracks. The center element, R17 will remain centered, and the shifts will be done symmetrically about R17.

Figure 5A:
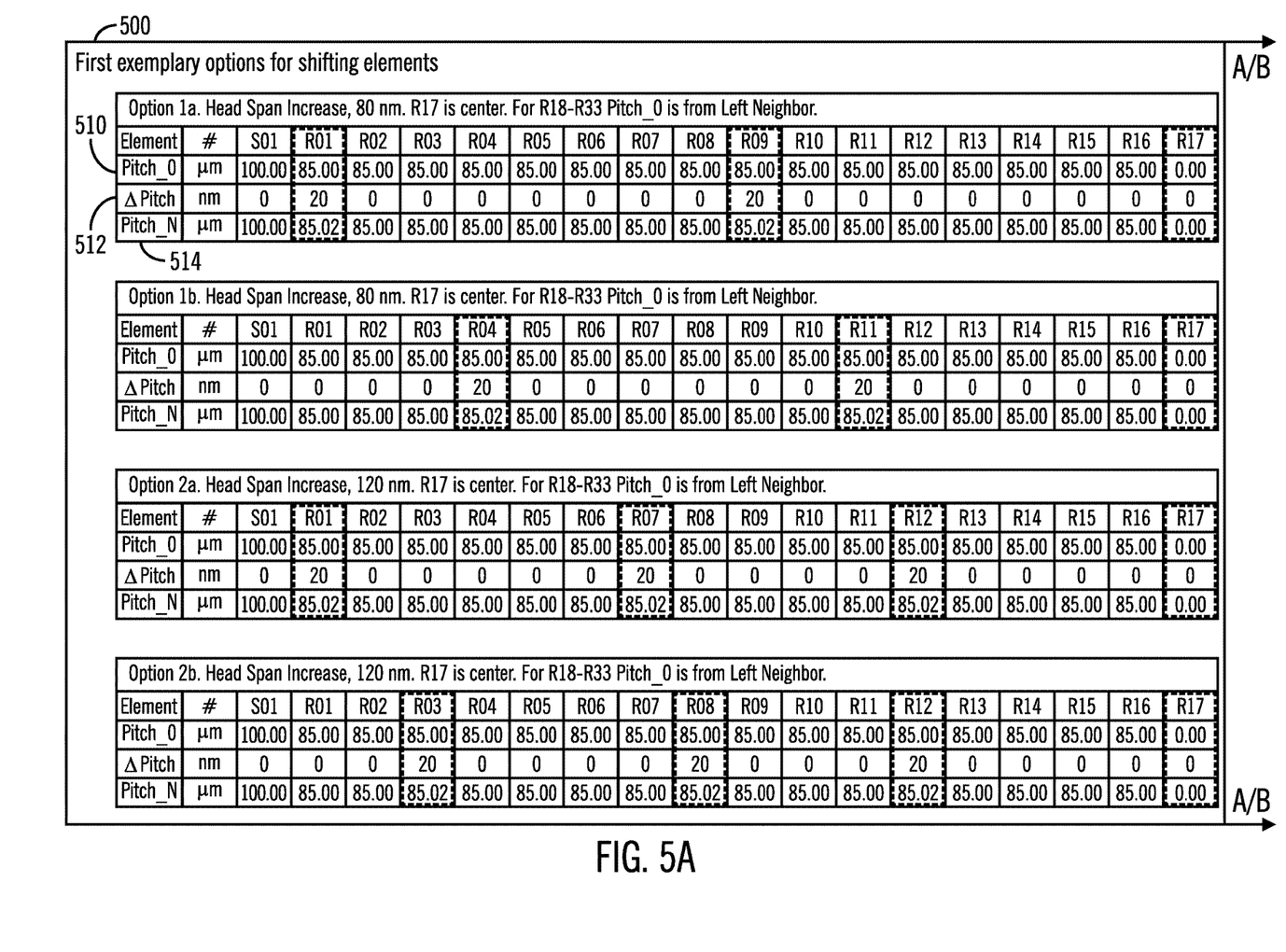
FIG. 5A and FIG. 5B show a block diagram that shows first exemplary options for shifting elements, in accordance with certain embodiments.
Figure 5B:
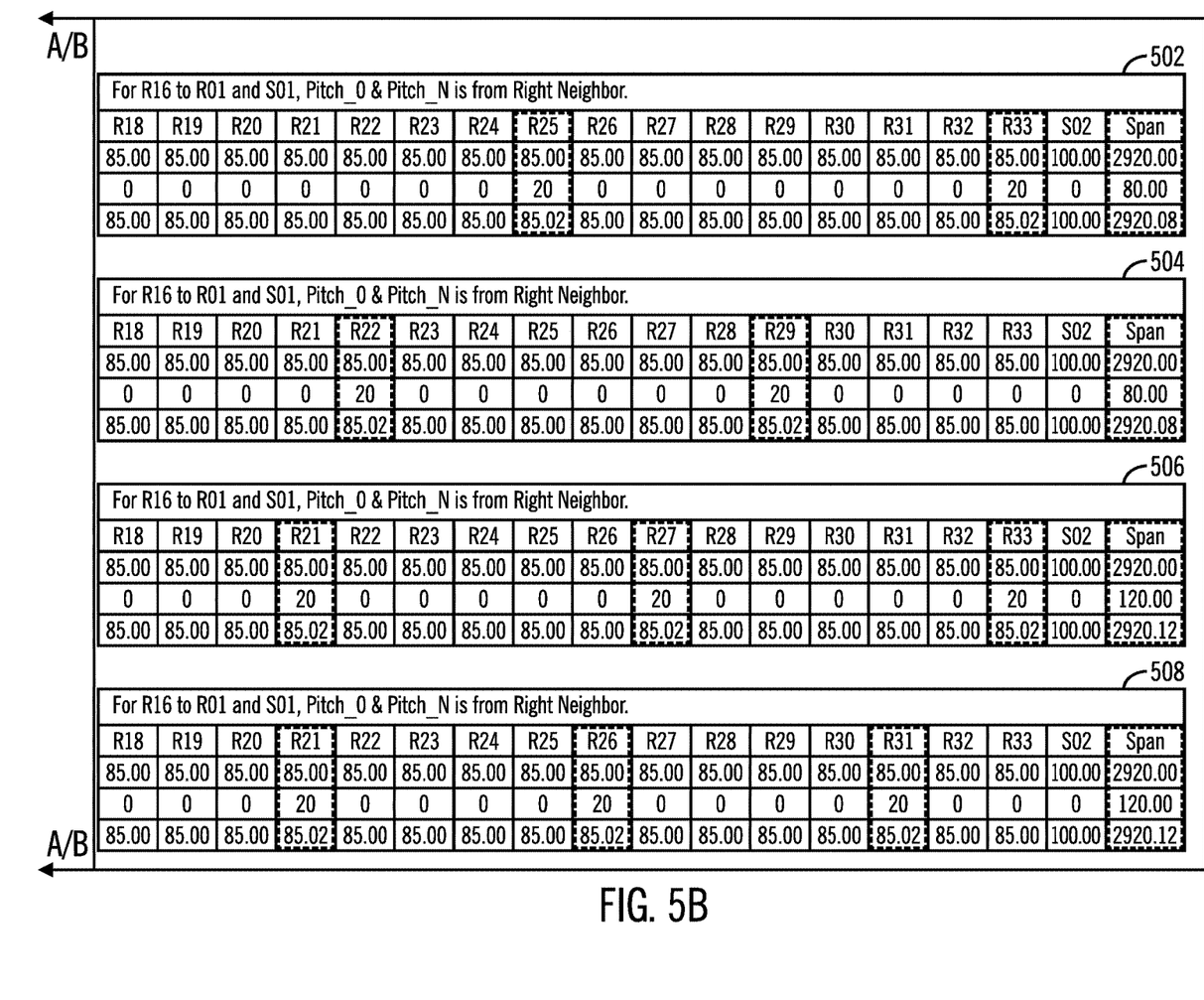

FIG. 5 shows a block diagram 500 that shows first exemplary options for shifting elements, in accordance with certain embodiments.

Options 1a 502 and 1b 504 show examples of a span shift, ΔSpan, of 80 nm while Options 2a 506 and 2b 508 show examples of 120 nm shifts respectively. For the options, the servo elements are S01 or S02 and reader (writer) elements are R01 to R33. Pitch_0 (reference numeral 510) is the initial pitch (i.e., the pitch in the absence of the shift), and ΔPitch (reference numeral 512) gives the change in pitch for the given element relative to Pitch_0. Pitch_N (reference numeral 514) is the new pitch after the change in pitch, (i.e., Pitch_N=Pitch_0+ΔPitch).

In the examples, the desired span change is higher by 80 nm for Options 1a and 1b and 120 nm for Options 2a and 2b. If the shift in span were negative, the sign of ΔPitch would be negative. The total change in head span is:

$$\Delta Span = N_{elementShift} \cdot \Delta Pitch \qquad (2)$$

For the 80 nm shift, $N_{elementShift}$ is 4 and for the 120 nm shift, $N_{elementShift}$ is 6. To ensure symmetry, $N_{elementShift}$ is an even number.

It should be noted that in FIG. 5, the reader R17 is in the center. In option 1a shifts are made to readers R01, R09, R25 and R33 and in option 1b similar shifts are made to readers R04, R11, R22, R29. The selection of readers for shifting may be performed experimentally. The total shift in option 1a and 1b is 80 nm, whereas the total shift in option 2a, 2b is 120 nm. Instead or shifting readers, in alternative embodiments writers could be shifted as needed.

Figure 6A:
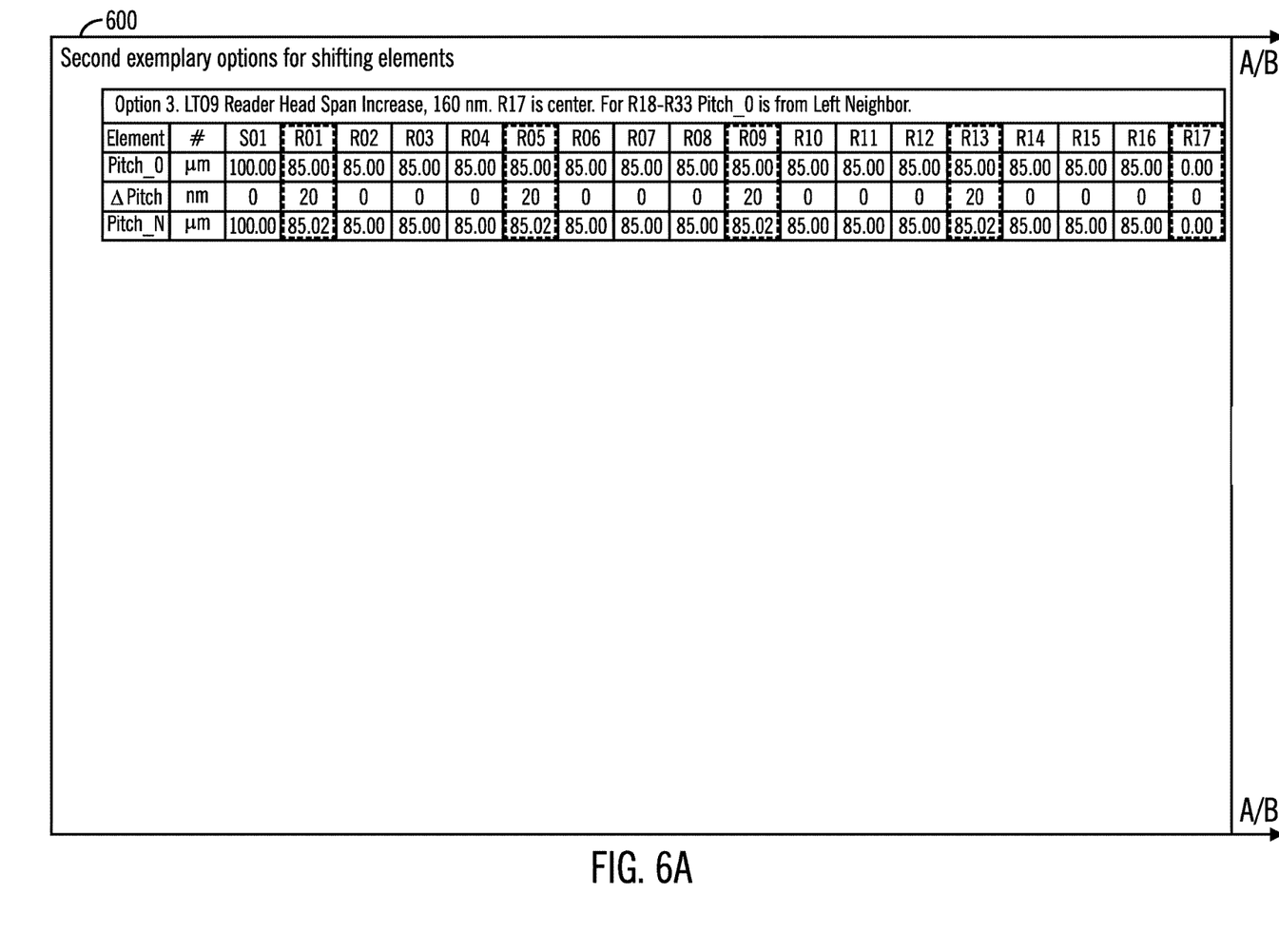
FIG. 6A and FIG. 6B show a block diagram that shows second exemplary options for shifting elements, in accordance with certain embodiment
Figure 6B:
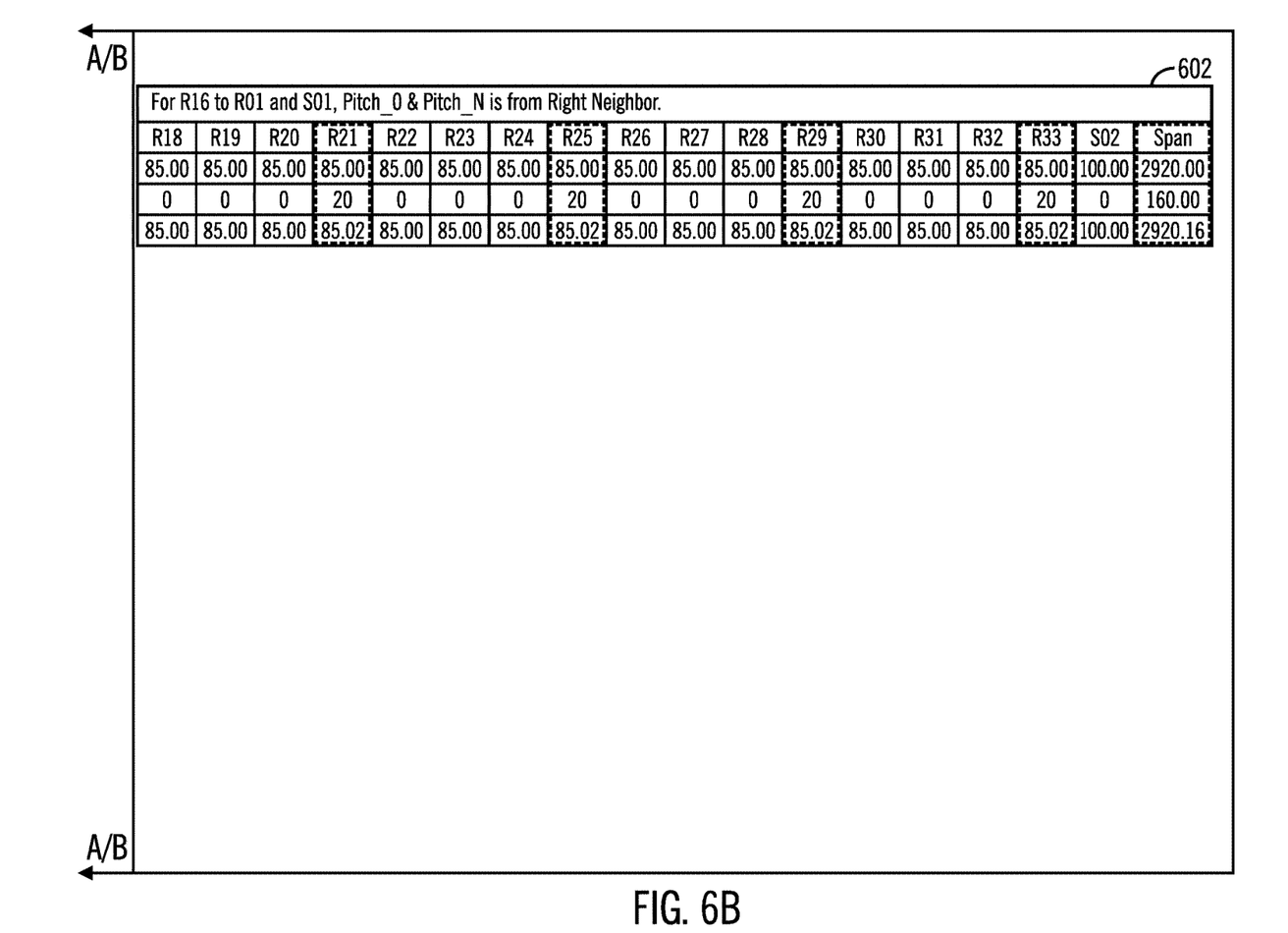

FIG. 6 shows a block diagram 600 that shows second exemplary options (option 3 602) for shifting elements, in accordance with certain embodiments. Option 3 shows an example of a span shift, ΔSpan, of 160 nm. It can be seen that 8 reader elements have been shifted by 20 nm to increase head span by 160 nm, where shift can only per performed in multiples of a minimum of 20 nm.

Figure 7A:
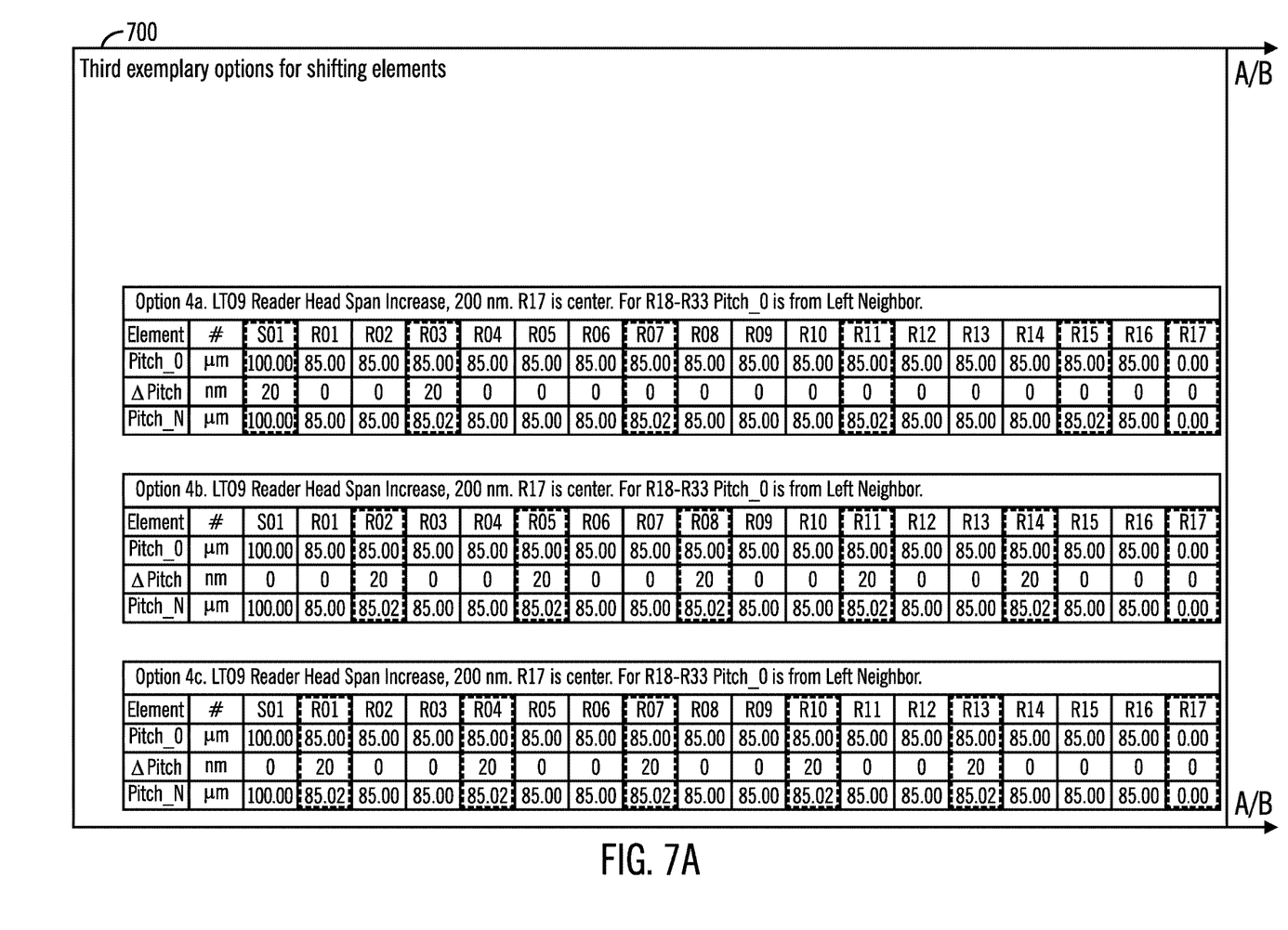
FIG. 7A and FIG. 7B show a block diagram that shows second exemplary options for shifting elements, in accordance with certain embodiments.
Figure 7B:
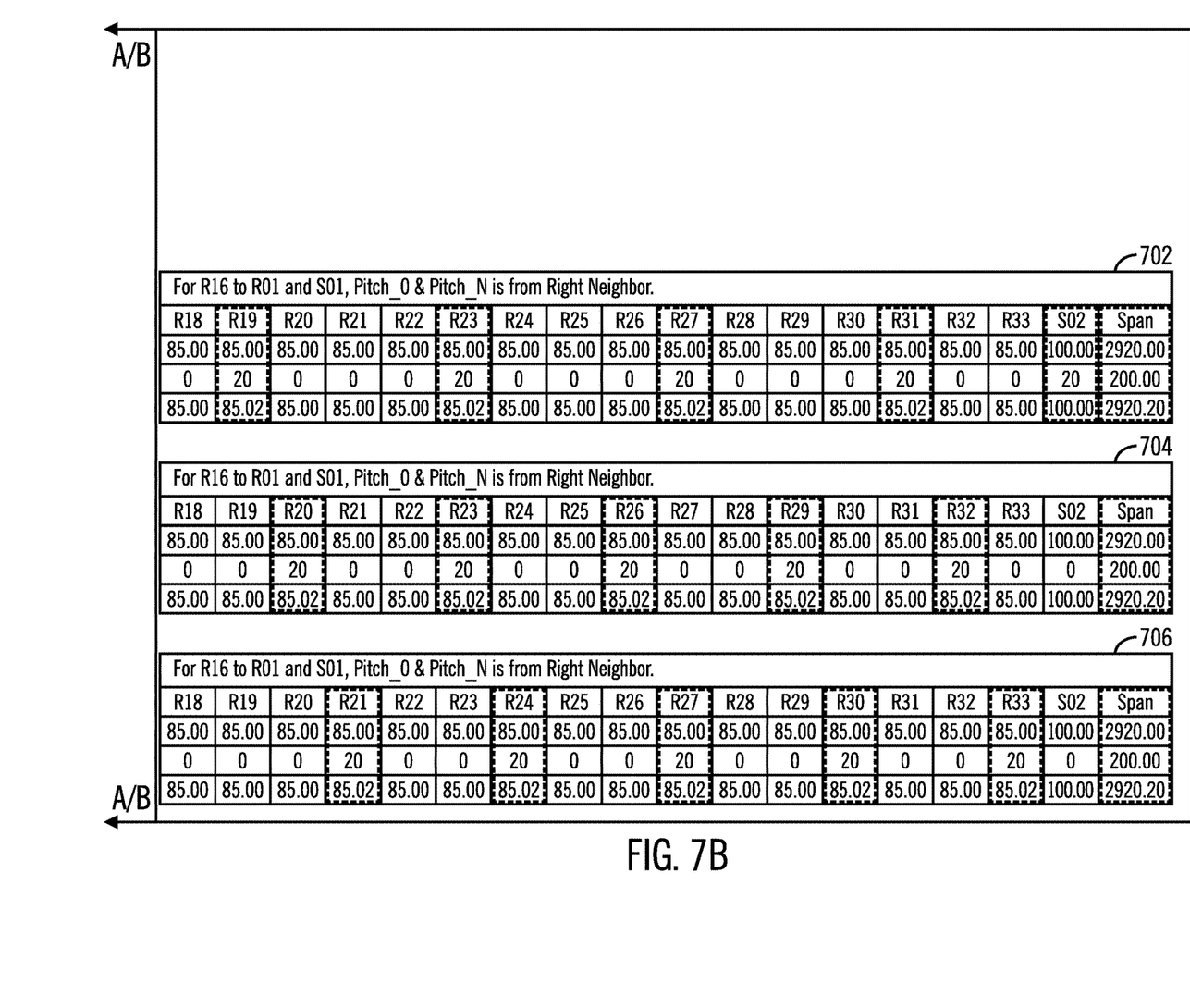

FIG. 7 shows a block diagram 700 that shows second exemplary options (option 4a 702, 4b 704, 4c 706) for shifting elements, in accordance with certain embodiments. Options 4a-c show examples of a span shift, ΔSpan, of 200 nm. It can be seen that 10 reader elements have been shifted by 20 nm to increase head span by 200 nm, where shift can only per performed in multiples of a minimum of 20 nm.

Option 4a 702 spreads the spacing out across the entire width. In option 4a, the shifts start with the $2^{nd}$ elements from the center (R15 and R19), and then steps every $4^{th}$ element until the servos. Options 4b and 4c maintain the location of the change in step constant at every $3^{rd}$ element, but move the location where the Pt step occurs further from the center at the $3^{rd}$ and $4^{th}$ element from the center as the first change in step. In can be seen that different combinations of readers may be shifted in different embodiments.

Therefore FIG. 1-7 illustrate certain embodiments in which elements are shifted symmetrically to align read heads to write heads to account for change in head span. The magnetic tape head is comprised of a plurality of elements, wherein a pitch between adjacent elements of the plurality of elements is not identical and the plurality of elements comprise readers or writers.

While ideally all modules should have identical head spans, this is not physically possible. Furthermore, the minimum resolution is twice the minimum step size. The modules will have a distribution of head spans. For example, the reader modules, RM, have a nominal head span of 3000 μm and the writer modules, WM, have a nominal head span of 3200 μm. The WM and RM may both have a range of +/−150 μm, so the WM would span from 3050 to 3350 μm and the RM would span from 2850 to 3150 μm. The desired shift needed would be −200 μm to the WM to match with the nominal of the RM. With the shift, both WM and RM would have a nominal HS of 3000 μm, and would both range from 2850 to 3150 μm. Also it is to be noted, that for a minimum step size of 20 nm, the minimum resolution for shifting a module head span would be 2×20 or 40 nm. Since there is a minimum step size and embodiments make the shift symmetric, then the modules cannot be aligned better than within twice of the minimum step size.

A total of shifts of the elements of the plurality of elements that are shifted add up to a desired total shift to realign a plurality of modules, such that a median head span of each module type match as close as possible to a desired value the head span for all module types. The median head span is the median of all head spans of the plurality of modules.

A head span is increased by multiples of a minimum step size while realigning the plurality of modules such that a median head span of each module type match as close as possible to a desired value the head span for all module types.

A group of elements of the plurality of elements may have a different pitch or separation from other groups of elements. The magnetic tape head may be comprised of servo elements that that are located within at most 50 nm of an ideal or specified location of servos.

In certain embodiments, the magnetic tape head contains symmetrically located servo elements such that a servo-to-servo separation of the symmetrically located servo elements are within 50 nm of an ideal or specified value, wherein the servo-to-servo separation is the head span. While less than 50 nm is preferred, the maximum tolerable limit is 50 nm, and embodiments try to locate the servo elements within (i.e., less than or equal to) 50 nm.

Additional Embodiment Details

The described operations may be implemented as a method (e.g., to simulate the design of the apparatus), apparatus, or computer program product (e.g., to simulate the design of the apparatus) using standard programming and/or engineering techniques to produce software, firmware, hardware, or any combination thereof. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 8:
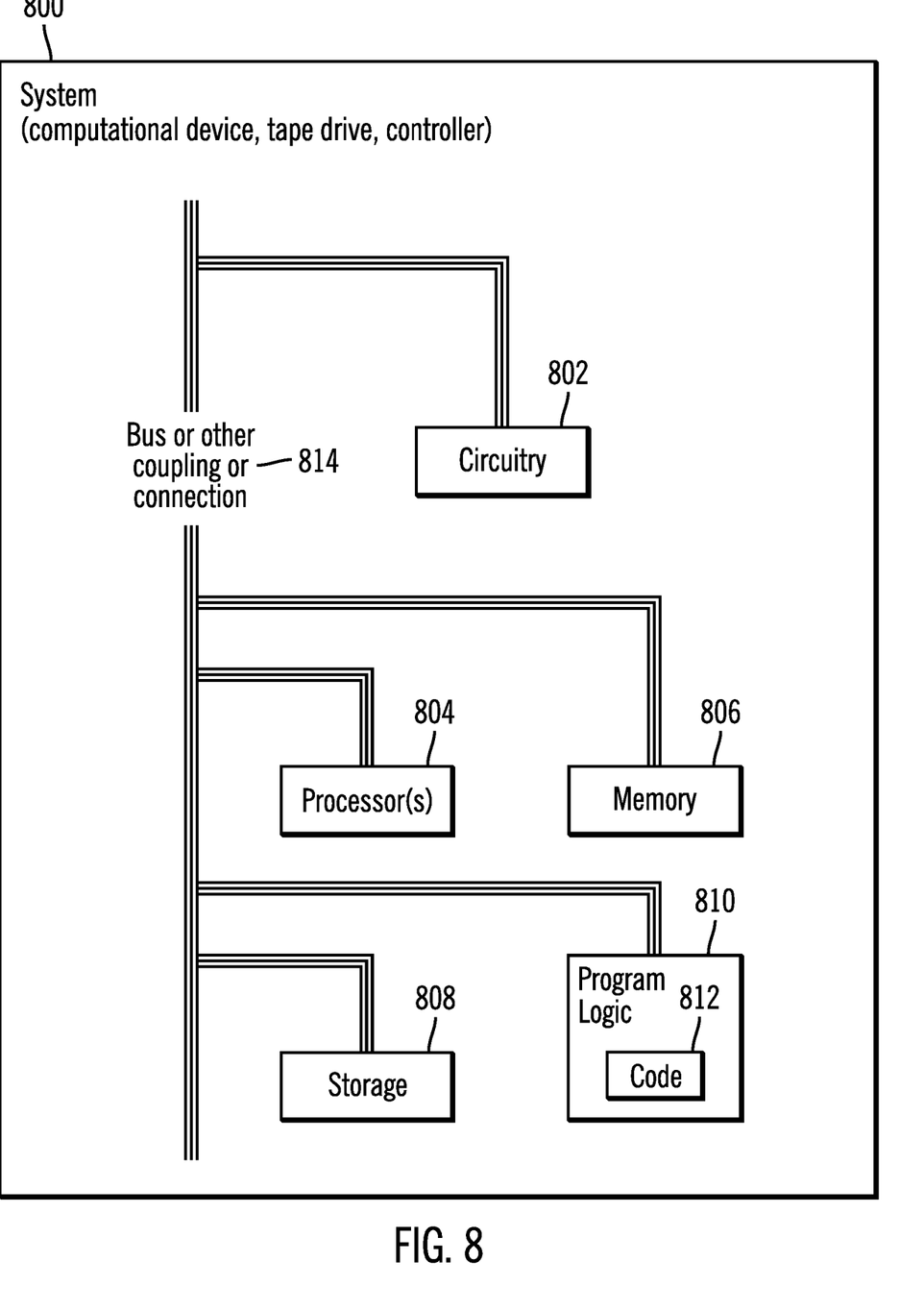
FIG. 8 illustrates a block diagram that shows certain elements that may be included in the tape drive or a computational device described in FIGS. 1-7, in accordance with certain embodiments.

FIG. 8 illustrates a block diagram that shows certain elements that may be included in the tape drive 102 or the computational device 108 or the controller 110, in accordance with certain embodiments. The system 800 may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. One or more of the components in the system 800 may communicate via a bus or via other coupling or connection 814. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

*IBM, z/OS, zSeries, pSeries, xSeries, BladeCenter, WebSphere, and DB2 are trademarks of International Business Machines Corporation registered in many jurisdictions worldwide.

What is claimed is:

1. A magnetic tape head, comprising:
a plurality of modules comprising reader modules and writer modules; and
a plurality of elements, wherein a total of shifts of selected elements of the plurality of elements that are shifted add up to a desired total shift to realign the plurality of modules, such that a median head span of each module type matches as close as possible to a desired value of a head span for all module types including the reader modules and the writer modules and wherein the head span is shifted at a wafer level.

2. The magnetic tape head of claim 1, wherein the plurality of elements comprise readers or writers, or both readers and writers.

3. The magnetic tape head of claim 2, wherein a head span is increased by multiples of a minimum step size while realigning the plurality of modules such that the median head span of each module type match as closely as possible to the desired value of the head span for all module types.

4. The magnetic tape head of claim 3, wherein a group of elements of the plurality of elements has a different pitch or separation from other groups of elements.

5. The magnetic tape head of claim 4, wherein the magnetic tape head contains symmetrically located servo elements such that a servo-to-servo separation of the symmetrically located servo elements are within 50 nm of an ideal or specified value, and wherein the servo-to-servo separation is the head span.

6. The magnetic tape head of claim 1, wherein a pitch between adjacent elements of the plurality of elements is not identical.

7. A magnetic tape drive, comprising:
a receptacle for magnetic tape; and
a magnetic tape head to read and write on the magnetic tape, the magnetic tape head, comprising:
a plurality of modules comprising reader modules and writer modules; and
a plurality of elements, wherein a total of shifts of selected elements of the plurality of elements that are shifted add up to a desired total shift to realign the plurality of modules, such that a median head span of each module type matches as close as possible to a desired value of a head span for all module types including the reader modules and the writer modules and wherein the head span is shifted at a wafer level.

8. The magnetic tape drive of claim 7, wherein the plurality of elements comprise readers or writers, or both readers and writers.

9. The magnetic tape drive of claim 8, wherein a head span is increased by multiples of a minimum step size while realigning the plurality of modules such that the median head span of each module type match as closely as possible to the desired value of the head span for all module types.

10. The magnetic tape drive of claim 9, wherein a group of elements of the plurality of elements has a different pitch or separation from other groups of elements.

11. The magnetic tape drive of claim 10, wherein the magnetic tape head contains symmetrically located servo elements such that a servo-to-servo separation of the symmetrically located servo elements are within 50 nm of an ideal or specified value, and wherein the servo-to-servo separation is the head span.

12. The magnetic tape drive of claim 7, wherein a pitch between adjacent elements of the plurality of elements is not identical.

13. A computational device, comprising:
a processor;
a tape drive coupled to the processor; and
a magnetic tape head in the tape drive to read and write on a magnetic tape in the tape drive, the magnetic tape head, comprising:
a plurality of modules comprising reader modules and writer modules; and
a plurality of elements, wherein a total of shifts of selected elements of the plurality of elements that are shifted add up to a desired total shift to realign the plurality of modules, such that a median head span of each module type matches as close as possible to a desired value of a head span for all module types including the reader modules and the writer modules and wherein the head span is shifted at a wafer level.

14. The computational device of claim 13, wherein the plurality of elements comprise readers or writers, or both readers and writers.

15. The computational device of claim 14, wherein a head span is increased by multiples of a minimum step size while realigning the plurality of modules such that the median head span of each module type match as closely as possible to the desired value of the head span for all module types.

16. The computational device of claim 15, wherein a group of elements of the plurality of elements has a different pitch or separation from other groups of elements.

17. The computational device of claim 16, wherein the magnetic tape head contains symmetrically located servo elements such that a servo-to-servo separation of the symmetrically located servo elements are within 50 nm of an ideal or specified value, and wherein the servo-to-servo separation is the head span.

18. The computational device of claim 13, wherein a pitch between adjacent elements of the plurality of elements is not identical.

\* \* \* \* \*